(No Model.) 3 Sheets—Sheet 2.
O. KIRLIN.
VEHICLE BRAKE.
No. 393,476. Patented Nov. 27, 1888.
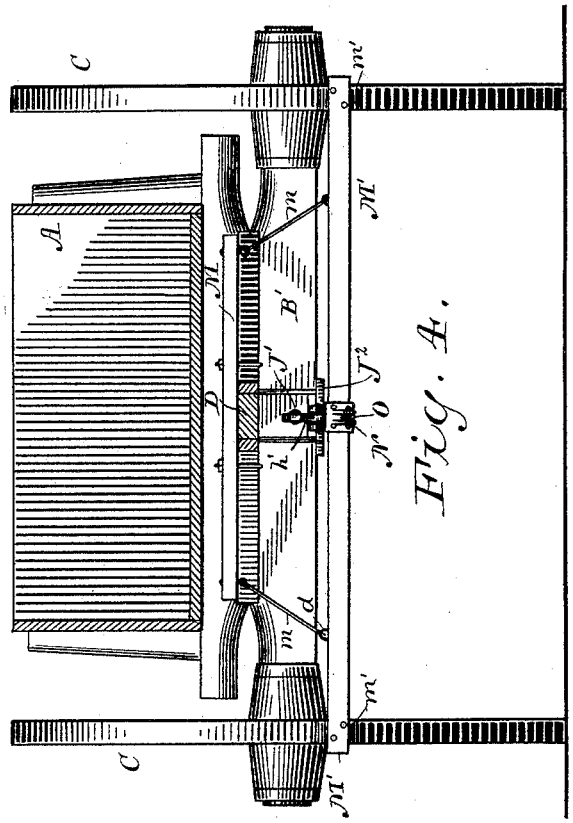
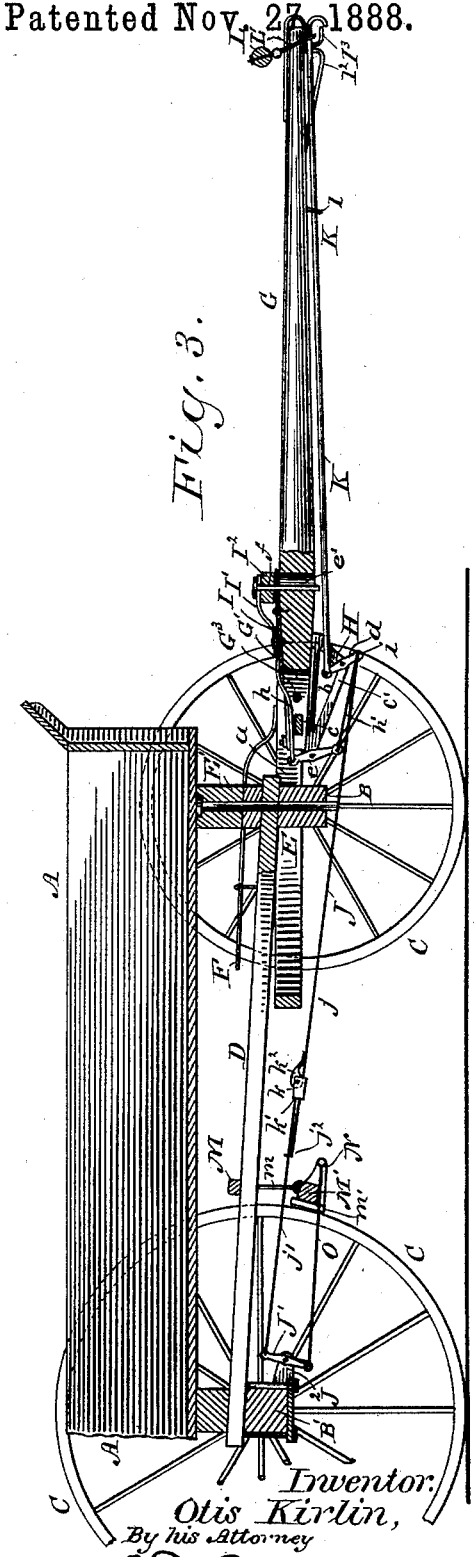
Witnesses.
H. C. Newman,
G. F. Downing.
Inventor:
Otis Kirlin,
By his Attorney
H. A. Surman.

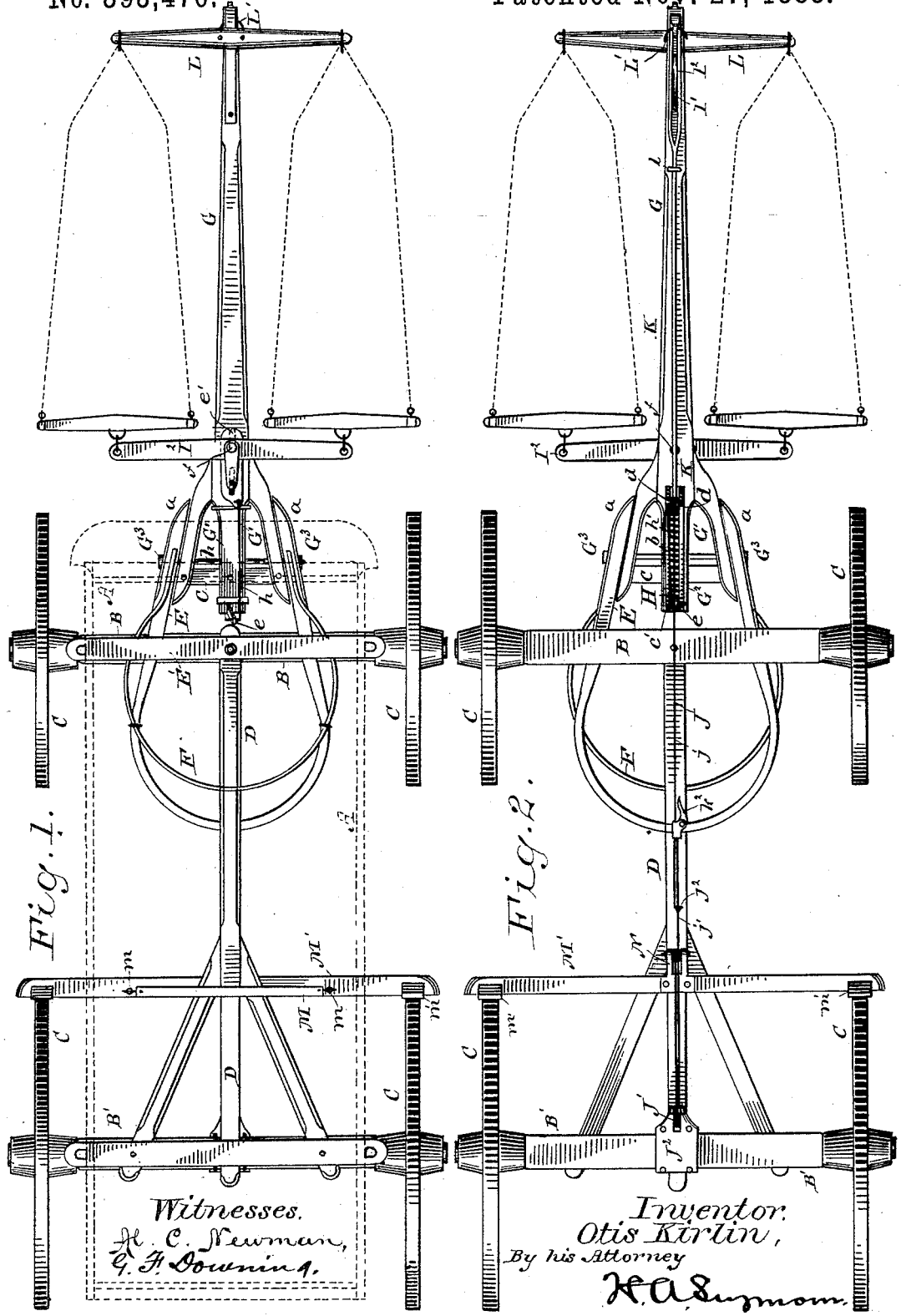

(No Model.) 3 Sheets—Sheet 3.

O. KIRLIN.
VEHICLE BRAKE.

No. 393,476. Patented Nov. 27, 1888.

Witnesses.
H. C. Newman,
G. F. Downing.

Inventor.
Otis Kirlin,
By his Attorney

UNITED STATES PATENT OFFICE.

OTIS KIRLIN, OF WEBSTER, DAKOTA TERRITORY.

VEHICLE-BRAKE.

SPECIFICATION forming part of Letters Patent No. 393,476, dated November 27, 1888.

Application filed December 22, 1887. Serial No. 258,740. (No model.)

*To all whom it may concern:*

Be it known that I, OTIS KIRLIN, of Webster, in the county of Day and Territory of Dakota, have invented certain new and useful Improvements in Automatic Vehicle-Brakes; and I do hereby declare the following to be a full, clear, and exact description of the invention, such as will enable others skilled in the art to which it appertains to make and use the same.

My invention relates to an improvement in vehicle-brakes, and more particularly to that class in which the brake is operated automatically by the horses when the vehicle is on a downgrade.

The object of my present invention is to provide means whereby the brakes are held away from the wheels when the vehicle is being drawn.

A further object is to so connect the brake-bar to the wagon that the backing of the vehicle will release the brake from the wheels.

A further object is to provide suitable means whereby the brake mechanism may be adjusted to vehicles of different sizes quickly and easily, and by which the parts may be tightened, should they work loose from any cause.

With these objects in view my invention consists in the novel construction and peculiar combination and arrangement of parts, as will be hereinafter set forth, and pointed out in the claims.

Figure 5:
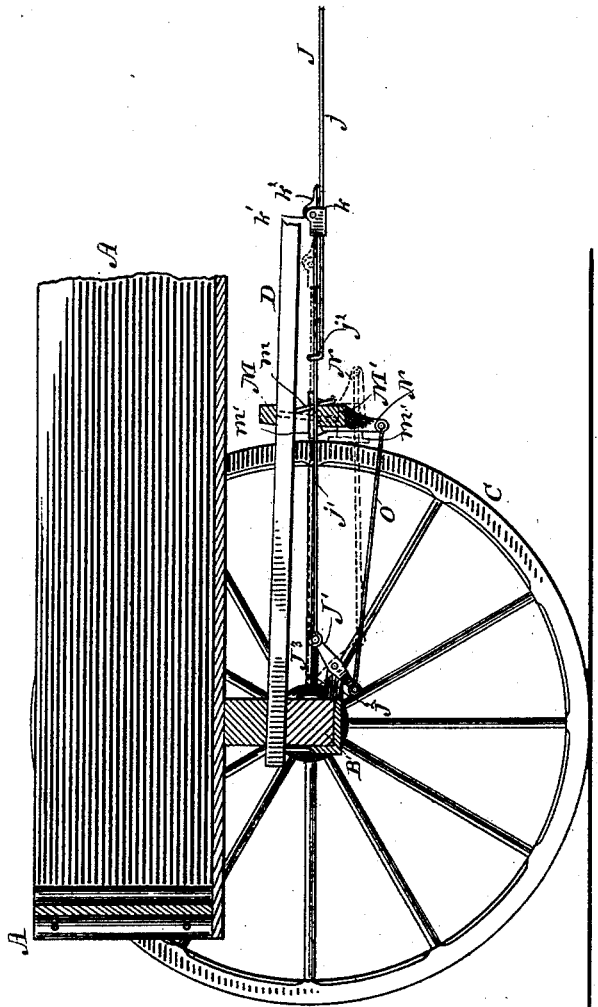
Figure 6:
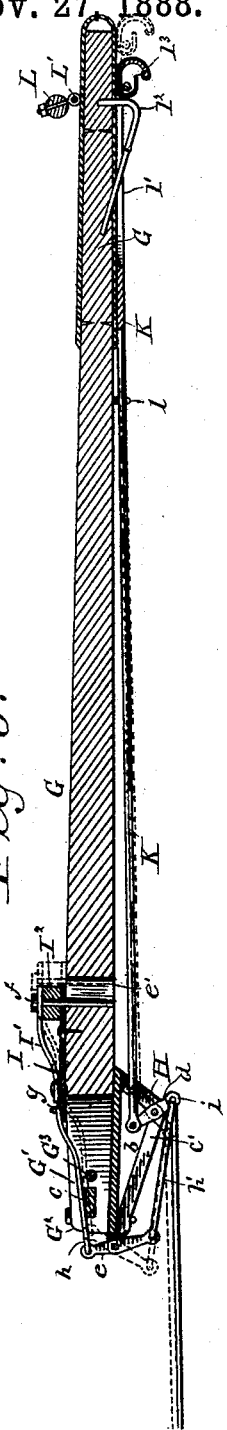

In the accompanying drawings, Figure 1 is a top plan view of a wagon embodying my invention. Fig. 2 is a bottom plan view of the same. Fig. 3 is a longitudinal sectional view of a wagon, showing the positions of the several parts. Fig. 4 is an end view of the same, showing the attachment of the brake-bar. Figs. 5 and 6 are views illustrating certain details.

A indicates a wagon provided with axles B B' at front and rear, carrying wheels C at their ends, and connected by a reach, D, in any preferred manner.

The hounds E of the front axle, B, are preferably inserted between the axle and the bolster E', and made of a single piece of wood bent in substantially U shape, having the ends $a\,a$ projected beyond the axle B, as shown. The forward end of the reach D is pivoted between the axle B and bolster E', and is controlled in its movements by a U-shaped guide-rod, F, which is secured at its ends to the hounds near the free extremities $a$, and bent upwardly slightly to project rearwardly over the bolster, as shown. If desired, the guide-rod F may be further secured to the hounds in rear of the bolster, by means of eyebolts or otherwise, to permit a proper swinging movement of the front axle and attached parts. A tongue, G, having a forked inner end, G', is inserted between the free ends of the hounds and adapted to fit loosely therein, a pivot-bolt, $G^3$, passing transversely through the hounds and this forked end of the tongue to pivotally connect these parts together. The tongue G is also provided with an extension, $b$, which projects rearwardly between the arms of the fork G', a cross bar or stay, $c$, passing through a transverse perforation in the extension $G^2$, and connecting the free ends of the fork G', as shown, to brace the arms of the fork. The extension $G^2$ serves to receive a bracket, H, which is clamped or otherwise secured thereto on its under side, and provided with two depending arms, $c'\,c'$, for the reception of a lever, $d$, that is pivoted between these arms, for a purpose presently explained. The inner extremity of the bracket H is bifurcated for the reception of a lever, $e$, the upper end of which is preferably bent laterally and upwardly to align with one side of the extension $G^2$.

A plate, I, is slidingly attached to the upper face of the tongue G, preferably in front of the fork G', and a plate, I', is attached to the plate I, near its rear end, as shown in Figs. 1 and 3. These plates I I' are perforated near their outer ends for the reception of a pin, $f$, which passes through the perforations and through a doubletree, $I^2$, that is inserted between said plates, the end of the pin $f$ being adapted to work in an elongated slot, $e'$, made in the upper face of the tongue G. Thus it will be seen that when the doubletree is moved backward or forward by the movements of the horses the plate will be actuated in unison therewith.

To the inner end of the plate I, or preferably to a lug, $g$, made integral therewith at one side, is attached one end of a rod, $h$, which connects at its opposite end to the upper arm of the lever $e$. A rod, $h'$, which is loosely attached to the lower arm of the lever e, is connected at its other end with a pin, i, that projects from one side of the lever d at its lower end. This pin i is preferably passed through ears or lugs formed on the lower end of the lever d, and serves as a means of connection for a sectional rod, J, to said lever, this rod extending in the same direction as the rod h', but of much greater length. The sectional rod J is projected rearwardly and connected to a lever, J', which is pivoted in the bifurcated end of a bracket, J², secured to the under side of the rear axle of the vehicle.

The rod J is composed of two sections, $j\ j'$, the one, $j$, being made preferably longer than the other and provided at its end with an eye or loop, $j^2$, through which the section $j'$ is adapted to slide. One end of the section $j'$ of this rod J is preferably made hook-shaped to enable its ready attachment to the lever J', while the other end of said section is provided with a block, $k$, having a perforation, through which the section $j$ is adapted to slide. The block $k$ has a recessed portion, $k'$, at its front upper corner for the reception of a cam-lever, $k^2$, which, when operated, is adapted to bite or impinge against the section $j$ of rod J and hold the two sections $j\ j'$ in fixed relation to each other and producing in effect one continuous rod.

The upper end of the lever d is bifurcated or provided with ears similar to the lower end of said lever for the reception of a long bar or rod, K, which is pivoted between said ears and extended outwardly to the outer end of the tongue G, as shown in Figs. 3 and 6. This rod or bar K is guided at suitable intervals by loops $l$, secured to the tongue G, and being flattened near its outer end is formed with a slot, $l'$, into which a bent arm, $l^2$, that is secured to the tongue, is adapted to work. The outer extremity of the rod or bar K is made hook-shaped and provided with a short metal piece, $l^3$, which is preferably bent around the hooked end of said rod and projects through the slot $l'$ to form a hook, as shown in Figs. 3 and 6.

The doubletree I² is provided at each end with singletrees that are connected thereto in the usual manner.

The spreading-bar L is provided with a loop or ring, L', which is loosely attached to said bar, and is adapted to be placed over the end of the tongue and engage the hook $l^3$, for a purpose which will be presently explained.

A cross-bar, M, is secured to the reach D at a point at right angles to the peripheries of the rear wheels of the vehicle. Loosely attached to the ends of this bar M, by means of links $m$, is a brake-bar, M', this bar M' being suspended by the links $m$ at a suitable distance and provided at or near its ends with brake-shoes $m'$, which latter may be of any preferred form of construction.

The brake-bar M' is furnished at its center and on its front side with a forwardly-extending bracket, N, which is formed with ears at its free end for the reception of one end of a rod, O, that is pivoted between said ears. The rod O, being extended preferably beneath the brake-bar M', is attached to the lower end of the lever J', that is supported upon a slotted bracket, J³, which is clipped fast to the rear axle, B'.

The brake mechanism being thus constructed and arranged is operated as follows: The horses being hitched to the vehicle in the usual manner, the draft will be upon the pin which connects the doubletree to the tongue. The plates I I' and doubletree will be held by the same pin, as previously explained, and retained in their forward position when the vehicle is forwardly drawn, and thus the brake bar and shoes will be held a sufficient distance from the wheels by means of the rods and levers above alluded to, which operation will be readily understood upon reference to the drawings. When the vehicle is on a downgrade, the checking of the horses to hold back the vehicle will produce a pull upon the spreading-bar L, which operation will draw bar K rearwardly, and, through the medium of the lever d, operate the rod J, the latter in turn, by means of lever J' and bar O, causing the brake-shoes to forcibly bear upon the wheels. These movements will be permitted by the rearward sliding action of the plates I I'. The plate I being attached to the same end of the bell-crank lever with the rod K, by means of rod $h$, lever $e$, and rod $h'$, it will be seen that when a pulling action is again brought to bear upon the doubletree I² the plates I I' will be slid forwardly until their retaining-pin reaches the end of its slot. This operation will cause the reverse movements of the rods and levers last above described, and the brake-shoes will be released from the wheels and retained in such released position. When the vehicle is backed, the brakes will of course be applied, as previously explained; but as the brake-bar M' is hung or suspended the backward turning of the wheels causes the shoes to turn, the rod O aiding in such turning by its attachment to the forward side of the brake-bar. The brakes being thus released the vehicle can be readily backed.

By making the rod J extensible the device can be easily and quickly adapted to wagons with reaches of varying lengths, and should the parts of the mechanism become loose they may be tightened by shortening this rod and clamping the two sections thereof together by means which have been explained.

It is manifest that numerous changes might be made in the constructive details of my invention without departing from the spirit thereof or exceeding its scope; hence I do not wish to limit myself to the exact details of construction shown and described; but, Having fully described my invention, what I claim as new, and desire to secure by Letters Patent, is—

1. The combination, with a vehicle-tongue, of a plate slidingly attached to the tongue, and an extensible rod-and-lever mechanism connecting said plate to the brake-bar, substantially as set forth.

2. The combination, with a vehicle-tongue and a spreading-bar, of a bracket secured to the under side thereof, a lever pivoted in said bracket, a rod attached to one end of said lever and extended to the forward end of the tongue, a link or ring connecting this rod with the spreading-bar, and an extensible rod connected to the lever to actuate the brakes, substantially as set forth.

3. The combination, with a vehicle-tongue, a bracket secured to the under side thereof, and a spreading-bar, of a lever pivoted in said bracket, a rod attached at one end to the lever and at its other end to the spreading-bar, and an extensible rod attached to said lever and extended rearwardly to operate the brakes, substantially as set forth.

4. The combination, with a tongue, a reach, and brake-beam loosely suspended from the reach, said brake-beam having a forwardly-extending projection, of rod-and-lever mechanism pivotally connected with this forward projection, whereby the brake-beam is turned over on its point of suspension by any backward turn of the wheels, substantially as set forth.

5. The combination, with a wagon-brake, of a rod composed of two sections adjustable relatively to each other, a block on one section, and an eccentric or cam lever pivoted in said block to impinge against the other section and retain the two sections in locked adjustment, substantially as set forth.

6. The combination, with a vehicle-tongue, a bracket secured to the under side thereof, and a spreading-bar, of a lever pivoted in said bracket, a rod attached at one end to this lever and having a hook at its opposite end for attachment to the spreading-bar, a lever pivoted in the end of the bracket, and a rod connecting the two levers, a rod connecting the end of the latter-named lever with a sliding plate of the tongue, and a rod secured at one end to one lever and at the other end to the brake mechanism, substantially as set forth.

7. The combination, with a vehicle-tongue and rod-and-lever mechanism attached thereto, of a bracket secured to the rear axle, a lever pivoted in said bracket, a brake-bar carrying shoes suspended from a cross-bar of the vehicle, a rod connecting one end of said lever with the brake-rod, and an extensible rod connecting the opposite end of this lever with the rod-and-lever mechanism of the tongue, substantially as set forth.

8. The combination, with a vehicle-tongue and rod-and-lever mechanism attached thereto, of a bracket fixed to the rear axle, a lever pivoted in said bracket, a brake-bar carrying shoes suspended from the cross-bar of the vehicle, a bracket secured to the brake-bar and projecting forwardly therefrom, a rod attached to this bracket and extended rearwardly to connect to the lever, which is pivoted in a bracket of the rear axle, and a rod connecting said lever with the rod-and-lever mechanism of the tongue, so that when the vehicle is backed the brake will be released from the wheels, substantially as set forth.

In testimony whereof I have signed this specification in the presence of two subscribing witnesses.

OTIS KIRLIN.

Witnesses:
E. HUNTINGTON,
W. W. SEVERY.